United States Patent
Shin et al.

(10) Patent No.: US 10,614,220 B2
(45) Date of Patent: Apr. 7, 2020

(54) SYSTEM AND METHOD FOR SECURE BOOT OF ENGINE MANAGEMENT SYSTEM

(71) Applicant: HYUNDAI AUTRON CO., LTD., Seongnam-si (KR)

(72) Inventors: Eun-Ho Shin, Seoul (KR); Dae-Hyun Kim, Seoul (KR)

(73) Assignee: Hyundai Autron Co., Ltd., Seoul (KR)

( * ) Notice: Subject to any disclaimer, the term of this patent is extended or adjusted under 35 U.S.C. 154(b) by 204 days.

(21) Appl. No.: 15/827,745

(22) Filed: Nov. 30, 2017

(65) Prior Publication Data
US 2018/0157841 A1 Jun. 7, 2018

(30) Foreign Application Priority Data
Dec. 1, 2016 (KR) .................. 10-2016-0163065

(51) Int. Cl.
*G06F 21/57* (2013.01)
*G06F 21/44* (2013.01)
*G06F 21/74* (2013.01)

(52) U.S. Cl.
CPC ............ *G06F 21/575* (2013.01); *G06F 21/44* (2013.01); *G06F 21/74* (2013.01)

(58) Field of Classification Search
CPC ........ G06F 21/575; G06F 21/44; G06F 21/74; G06F 9/4401; G06F 9/4403; G06F 9/4406
See application file for complete search history.

(56) References Cited

U.S. PATENT DOCUMENTS

| | | | |
|---|---|---|---|
| 9,792,440 B1* | 10/2017 | Wang | G06F 21/44 |
| 2006/0161784 A1 | 7/2006 | Hunter et al. | |
| 2013/0013906 A1* | 1/2013 | Brown | G06F 21/575 713/2 |
| 2015/0331816 A1* | 11/2015 | Tokunaga | G06F 9/4812 710/267 |
| 2018/0068118 A1* | 3/2018 | Vandergeest | G06F 21/55 |

FOREIGN PATENT DOCUMENTS

| | | |
|---|---|---|
| KR | 10-2006-0047897 A | 5/2006 |
| KR | 10-2008-0072452 A | 8/2008 |
| KR | 10-2014-0068867 A | 6/2014 |
| KR | 2014-0120863 A | 10/2014 |
| KR | 2016-0068061 A | 6/2016 |
| WO | 2007033322 A2 | 3/2007 |

* cited by examiner

*Primary Examiner* — Paul E Callahan
(74) *Attorney, Agent, or Firm* — Baker & Hostetler LLP; Hyunho Park

(57) ABSTRACT

The present invention relates to a system and a method for secure boot of an engine management system, in which the system for secure boot of an engine management system, comprises a memory in which a boot code and at least one application are stored, a host CPU for sending a start-up command to a hardware security module HSM when a start-on or reset event occurs, and transmitting a remaining memory area authentication command to the HSM after executing the boot code when boot code authentication success is received from the HSM, and the HSM for starting up and performing authentication of the boot code stored in the memory as the start-up command is received, sending a boot code authentication result to the host CPU, and performing authentication of the rest of the memory excluding the boot code when the remaining memory area authentication command is received.

9 Claims, 7 Drawing Sheets

SYSTEM AND METHOD FOR SECURE BOOT OF ENGINE MANAGEMENT SYSTEM

CROSS REFERENCE TO RELATED APPLICATION

The present application claims the benefit of Korean Patent Application No. 10-2016-0163065 filed in the Korean Intellectual Property Office on Dec. 1, 2016, the entire contents of which are incorporated herein by reference.

BACKGROUND OF THE INVENTION

Field of the Invention

The present invention relates to a system and a method for secure boot of an engine management system, in which the secure boot is performed in such a manner that a hardware security module HSM checks integrity of the boot code in the foreground and integrity of the remaining of a memory in the background before a host CPU executes the boot code.

Background Art

The engine management system EMS is a small computer that controls the intake/exhaust system, the fuel supply system, and the ignition system by using information from various sensors installed in the engine. In order to control the fuel injection and ignition timing accurately, the engine synchronization for recognizing the current position of the engine should be prioritized. The engine synchronization is a procedure to recognize the current position of the engine according to crank signals and camshaft signals. In general, synchronization is performed using a method of detecting the gap of the crank signals.

FIG. 1 is a diagram for explaining such engine synchronization.

Referring to FIG. 1, a system for engine synchronization includes a crank position sensor 10, a cam position sensor 20, and an engine management system 30.

The crank position sensor 10 and the cam position sensor 20 respectively sense the rotations of the crankshaft and the camshaft so as to perform precise engine control and send the sensing results to the engine management system 30.

The crank position sensor 10 counts the valid teeth of the crankshaft and senses the gap so as to output an electrical signal that oscillates up and down.

The crankshaft has teeth formed with an interval of 6 degrees around the rotating body thereof in the circumferential direction. However, sixty teeth are not formed in the circumference of the whole circumference of the rotating body and the teeth are not formed on a partial section of the rotating body, wherein a gap is used as a reference point where two consecutive teeth are removed. The crank position sensor 10 is configured to sense the gap so as to generate at this portion signals with a period at least twice or more than that of the signals at the other portions.

The cam position sensor 20 senses the edge of the camshaft that rotates in association with the rotation of the crankshaft and outputs an electrical signal, of which phase is inversed. Further, the cam position sensor 20 detects the position of a piston according to the rotation of the camshaft so as to output a signal for determining a fuel injection timing to the engine management system 30.

The engine management system 30 computes the signals from the crank position sensor 10 and the cam position sensor 20 so as to perform the engine synchronization. That is, by analyzing the output signals from the crankshaft and camshaft, which are sensed by the crank position sensor 10 and the cam position sensor 20, it is possible to recognize the number of revolutions of the engine, the stroke process of each cylinder or the like without any temporal error such that fuel is injected and ignited at a proper injection timing and ignition timing.

Meanwhile, the engine management system 30 is a hard real time system and thus time constraints must be strictly observed in the early stage. In addition, secure boot is performed in the initial step, affecting the engine synchronization performance. The secure boot is used to verify the integrity of the software in the non-volatile memory area for every boot cycle. Therefore, the engine management system checks the integrity of the boot code in the boot ROM, checks the integrity of the application code area in the boot code, and then performs the secure boot by a method of starting up application SW.

However, if the secure boot is performed using conventional methods, when a system reset occurs during the running of the engine, the engine synchronization has to be carried out using the method of detecting the gaps of the crank signals. However, the gaps might not be sensed due to the long run time of the secure boot and thus a gap coming after one rotation of the engine has to be detected. In such a case, two fuel injections and ignition are missed in a four-cylinder engine system and this causes the engine stall in the engine that is currently running. Furthermore, if the engine stall occurs suddenly while during the operation of the engine, there is a safety problem that can put the driver at risk.

SUMMARY OF THE INVENTION

Technical Problem

Accordingly, the present invention has been made to solve the above-mentioned problems occurring in the prior arts, and it is an objective of the present invention to provide a system and a method for secure boot of an engine management system so as to prevent engine stall even if system reset occurs during engine operation.

Another objective of the present invention is to provide a system and a method for a secure boot of an engine management system, in which system initialization is finished as soon as possible at the time of re-starting after system reset and then the engine synchronization is performed so as to initiate fuel injection and ignition.

Meanwhile, the technical problems to be solved by the present invention is not limited to the above-mentioned technical problems, and various technical problems can be included within the scope of what will be apparent to those skilled in the art from the following description.

Technical Solution

To accomplish the above objectives, according to one aspect of the present invention, there is provided a system for secure boot of an engine management system, comprising a memory in which a boot code and at least one application are stored, a host CPU for sending a start-up command to a hardware security module HSM when a start-on or reset event occurs, and transmitting a remaining memory area authentication command to the HSM after executing the boot code when boot code authentication success is received from the HSM, and the HSM for starting up and performing authentication of the boot code stored in the memory as the start-up command is received, sending a boot code authentication result to the host CPU, and performing authentication of the remaining area of the memory excluding the boot code when the remaining memory area authentication command is received.

The memory can be divided into application areas according to intended use, and the priority order can be set for integrity authentication by application area.

When the boot code is executed, the host CPU can execute the application of the remaining memory area regardless of the integrity authentication result thereof while the HSM performs the integrity authentication of the remaining memory area.

The HSM can fetch the boot code from the memory on the basis of the location and size of the pre-stored boot code, compute an authentication code value from the boot code, and authenticate the integrity of the boot code on the basis of whether the computed authentication code value matches a pre-stored authentication code value, and transmit the authentication result of the boot code to the host CPU.

The HSM can compute an authentication code value for the rest of the memory according to the priority order and compare each computed authentication code value with a corresponding pre-stored authentication code value to check integrity.

The HSM can check the integrity of the boot code in the foreground and the integrity of the rest of the memory in the background, before the host CPU executes the boot code.

According to another aspect of the present invention, there is provided a method for secure boot of an engine management system provided with a host CPU and a hardware security module HSM, the method including (a) the step, by the host CPU, of transmitting a start-up command to the HSM when a start-on or reset event occurs, (b) the step, by the HSM, of starting up and authenticating a boot code stored in a memory and transmitting a boot code authentication result to the host CPU, (c) the step, by the host CPU, of executing the boot code and transmitting a remaining memory area authentication command to the HSM, and (d) the step, by the HSM, of performing authentication of the rest of the memory except the boot code.

According to the present invention, step (b) includes the step of fetching the boot code from the memory on the basis of the location and size of the pre-stored boot code, the step of calculating an authentication code value from the boot code, the step of authenticating the integrity of the boot code on the basis of whether the computed authentication code value matches a pre-stored authentication code value, and the step of transmitting an authentication result of the boot code to the host CPU.

In step (c), after transmitting the remaining memory area authentication command, the host CPU can execute the application of the rest of the memory except the boot code.

In step (d), the HSM can compute each authentication code value for the rest of the memory according to the priority order and compare each computed authentication code value with a pre-stored corresponding authentication code value to check integrity.

Meanwhile, the above-mentioned "method for secure boot of an engine management system" can be implemented in the form of a program and then recorded in a recording medium readable by an electronic device or distributed through a program download management device (a server or the like).

Effect of the Invention

According to the present invention, it is possible to ensure safety by preventing engine stall without affecting the boot process of the system.

In addition, the engine stall can be prevented and the system can be continuously operated even when system reset occurs during engine operation.

Besides, at the time of re-start after system reset, system initialization can be finished as soon as possible and engine synchronization is performed such that fuel injection and ignition can be started.

Meanwhile, the effects of the present invention are not limited to the above-mentioned effects, and various effects can be included within the scope that is obvious to a person skilled in the art from the following description.

| Brief Explanation of Reference Symbols | |
|---|---|
| 110: memory | 120: host CPU |
| 130: HSM | |

DETAILED DESCRIPTION OF THE PREFERRED EMBODIMENT

The foregoing and other objectives, features, and advantages of the present invention will become more apparent from the following detailed description taken in conjunction with the accompanying drawings.

Hereinafter, a system and a method for secure boot of an engine management system according to the present invention will be described in detail with reference to the accompanying drawings. The explained embodiments are provided so that those skilled in the art can easily understand the technical spirit of the present invention, and thus the present invention is not limited thereto. In addition, the accompanying drawings are schematic drawings for easily explaining the embodiments of the present invention and thus the matters represented in the accompanying drawings may be different from those actually implemented.

Meanwhile, each component shown below is only an example for implementing the present invention. Therefore, other components may be used in other implementations of the invention without departing from the spirit and scope of the invention. In addition, each component may be implemented solely by hardware or software configuration, but may be implemented by a combination of various hardware and software configurations performing the same function. In addition, two or more components may be implemented together by one hardware or software.

Besides, it should be also understood that the expression "including" certain elements is an "open type" expression just to say that components exit and do not exclude additional components.

Automotive power train systems require fast engine synchronization. Particularly, engine stall caused by system reset should not occur even if a serious error occurs while driving the engine. To this end, fast engine re-synchronization is required after the system reset, which means that the execution time of the secure boot should be minimized.

The present invention uses the foreground method and the background method together to minimize the execution time of secure boot. That is, with respect to initial operation, the foreground method is used for the boot code area and the background method is used for the remaining memory area. In the case of the background method, it is possible to divide a memory according to use and define the order of performing the secure boot according to the importance of each memory area.

The terms "application" and "application code" described below may have the same meaning.

Hereinafter, a method for secure boot of an engine management system will be described in detail with reference to the drawings.

Figure 1:
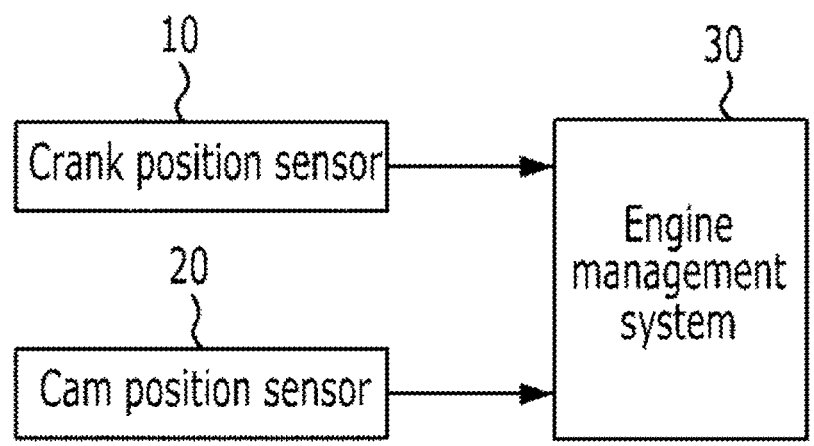
FIG. 1 is a diagram for explaining engine synchronization.
Figure 2:
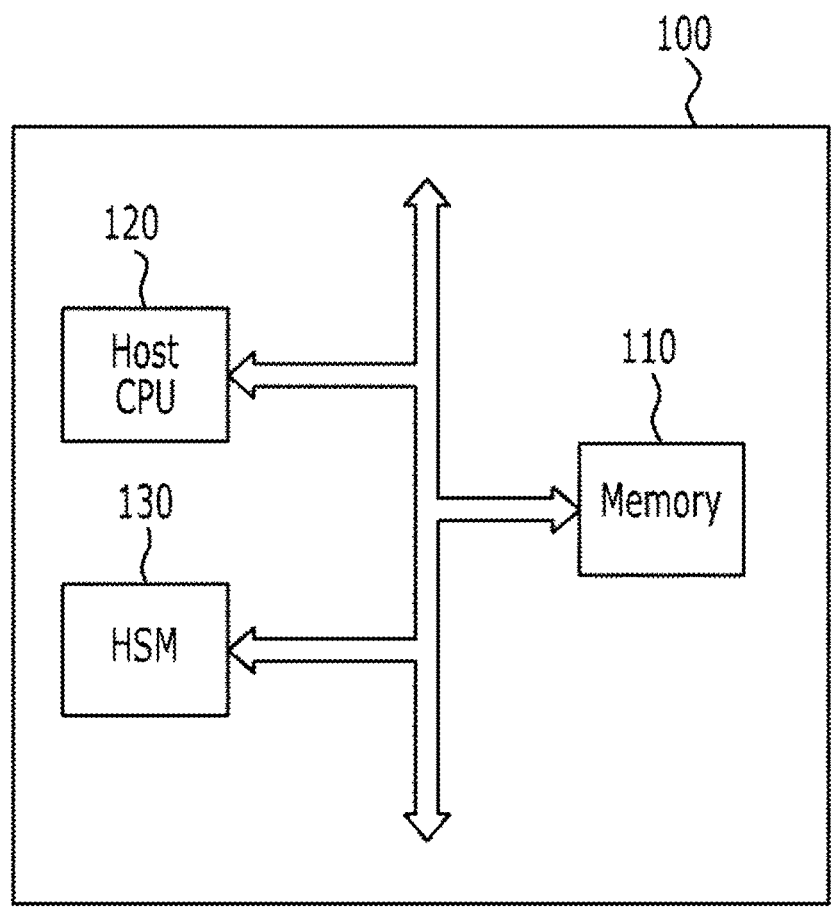
FIG. 2 and FIG. 3 are diagrams showing a system for secure boot of an engine management system according to the present invention.
Figure 3:
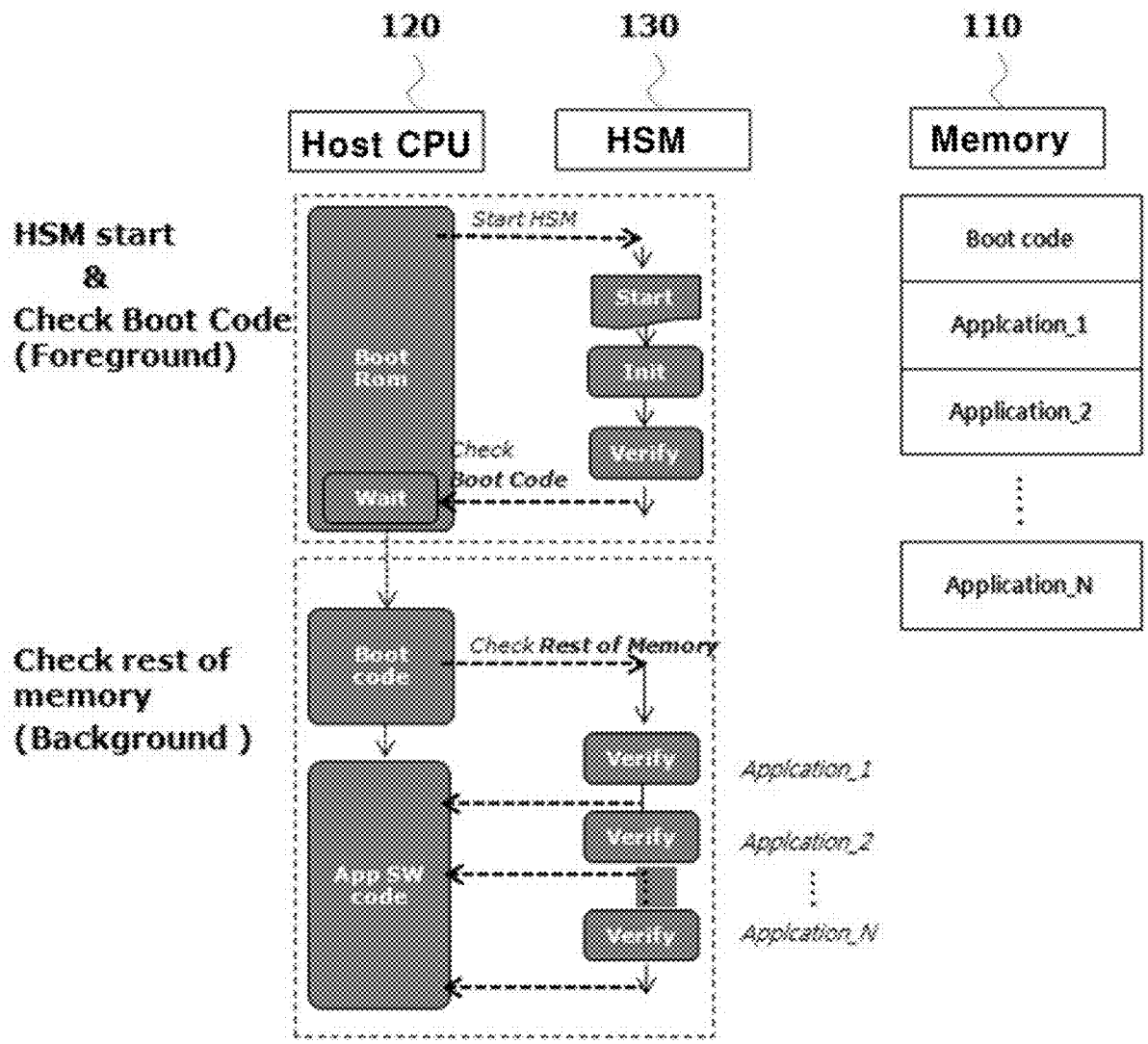
Figure 4:
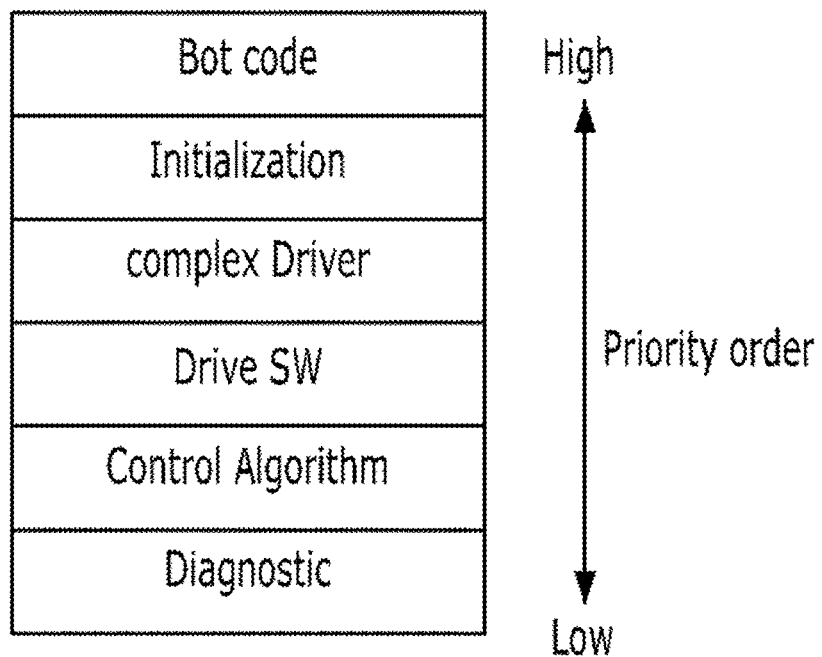
FIG. 4 is an illustrative view of a memory, of which area is divided according to the priority order according to the present invention.

FIG. 2 and FIG. 3 are diagrams showing a system for secure boot of an engine management system according to the present invention, and FIG. 4 is an illustrative diagram of a memory, of which area is divided according to the priority order according to the present invention, Referring to FIG. 2 and FIG. 3, a system for secure boot of an engine management system 100 includes a memory 110, a host CPU 120 and a hardware security module HSM 130.

The boot code is software for booting the engine management system, and the application code is software such as an application program running on the engine management system. The memory area in which the application code is stored can be divided into multiple areas such as application_1, application_2, . . . , application_n. Herein, if the priority order of the application is set, the application code can be placed in the application area according to the priority order. As such, the memory 110 may divide application areas according to intended use and define a priority order for integrity verification per application area. In addition, an encrypted authentication code value obtained by the encryption of the boot code is also stored in the memory 110. The authentication code value may be generated by applying a predetermined algorithm or function to the boot code for example as a cipher based message authentication code CMAC, and may be referred to as a digital signature value.

The host CPU 120 controls the overall operation of the engine management system.

Particularly, the host CPU 120 transmits a start-up command to the HSM 130 when a start-on or reset event occurs and the host CPU 120 executes a boot code when the boot code authentication success is received from the HSM 130, Then, the host CPU 120 transmits a remaining memory area authentication command to the HSM 130, wherein the remaining memory area authentication command may be a command for requesting integrity verification of the rest of the memory 110 excluding the boot code area.

The host CPU 120 executes the application codes of the remaining memory areas regardless of the authentication result of the application code while the HSM 130 authenticates the integrity of the remaining memory areas excluding the boot code. That is, when the boot code is executed, the host CPU 120 searches the memory 110 for an application code set to be automatically started so as to execute the same. The HSM 130 checks the integrity of the boot code in the foreground before executing the boot code in the host CPU 120 and checks the integrity of the rest of the memory 110 in the background.

When the start-up command is received from the host CPU 120, the HSM 130 starts up, authenticates the boot code stored in the memory 110, and transmits the boot code authentication result to the host CPU 120. That is, the HSM 130 fetches the boot code from the memory 110 on the basis of the location and size of the pre-stored boot code and computes the authentication code value from the boot code. Herein, the authentication code value may be for example a CMAC. Then, the HSM 130 compares the computed authentication code value with a pre-stored authentication code value such that the HSM 130 determines that the integrity authentication of the boot code is successful when both the computed authentication code value and a pre-stored authentication code value matches each other, while the HSM 130 determines that the integrity authentication of the boot code is failed when the both do not match each other. The HSM 130 sends the integrity authentication success or integrity authentication failure to the host CPU 120 as a boot code authentication result.

The HSM 130 performs authentication of the rest of the memory 110 excluding the boot code when the remaining memory area authentication command is received from the host CPU 120. Herein, the HSM 130 respectively computes authentication code values for the remaining memory areas according to the priority order and compares each of the computed authentication code values with corresponding one of pre-stored authentication code values so as to check integrity.

For example, as shown in FIG. 4, a case where a priority order is set in the order of a complex driver, driver SW, a control algorithm and a diagnostic program will be described. Since the engine management system prioritizes fast engine synchronization, the HSM 130 first authenticates the complex driver for synchronization and then authenticates integrity in the order of the driver SW, the control algorithm, and the diagnostic program, respectively.

The HSM 130 may not transmit any information to the host CPU 120 regarding the application authentication result performed in the background. Alternatively, the HSM 130 may inform the host CPU 120 of an application authentication result. Herein, the HSM 130 may transmit the application authentication result to the host CPU 120 after the application is started up.

Since the HSM 130 performs authentication in the background with respect to the remaining memory area excluding the boot code, the host CPU 120 may execute the code, for which integrity verification is not completed.

In the above description, the configuration in which the system includes all the memory 110, the host CPU 120, and the HSM 130 has been described. The host CPU 120 and the HSM 130 may be implemented in a single chip using, for example, the System-on-Chip SoC technology. Alternatively, the HSM 130 may be configured separately from other components of the system. In other words, only the HSM can be configured as a separate product in the system of FIG. 2.

Figure 5:
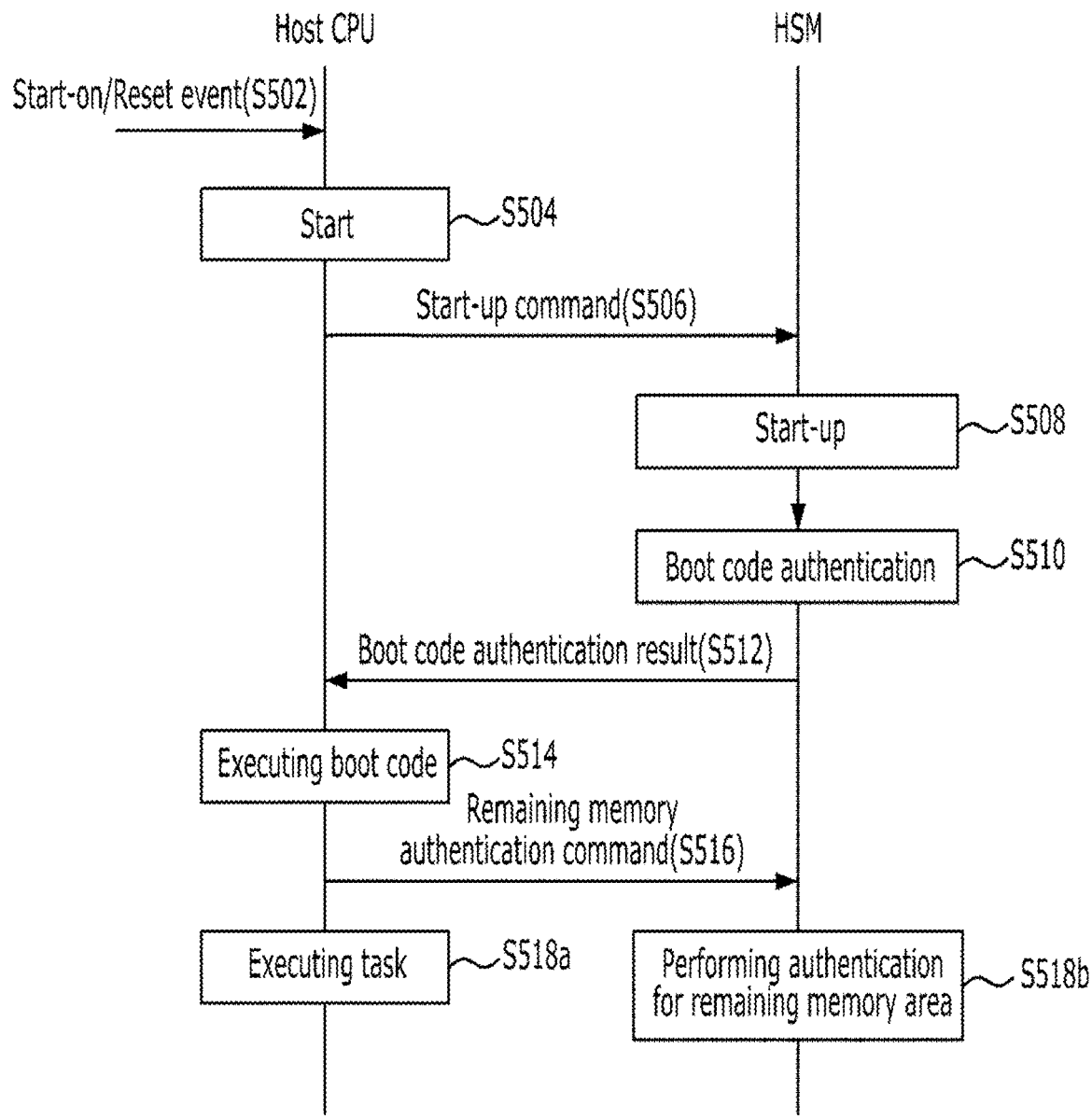
FIG. 5 and FIG. 6 are diagrams showing a method for secure boot of an engine management system according to the present invention.
Figure 6:
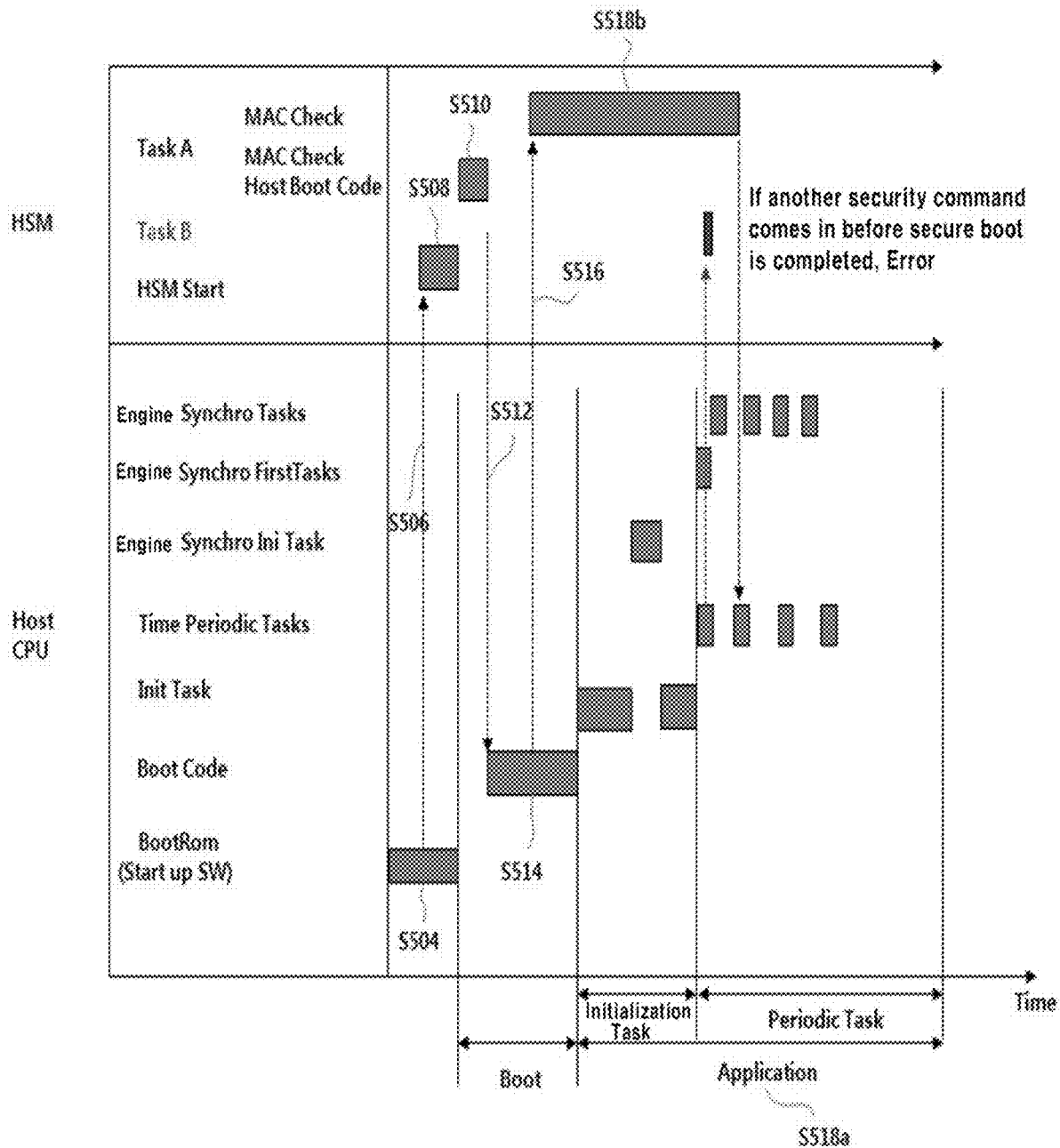

FIG. 5 and FIG. 6 are diagrams showing a method for secure boot of an engine management system according to the present invention.

Referring to FIG. 5 and FIG. 6, when the engine management system generates a start-on or reset event (S502), the host CPU executes a boot ROM (S504) and transmits a start-up command to the HSM (S506).

The HSM starts up (S508), authenticates the boot code stored in the memory (S510), and transmits the boot code authentication result to the host CPU (S512). Herein, the HSM computes the authentication code value for the boot code and verifies the integrity of the boot code by comparing the computed authentication code value with the pre-stored authentication code value. The method by which the HSM authenticates the boot code will be described in detail with reference to in FIG. 7.

When step S512 is performed, the host CPU executes the boot code (S514) and transmits the remaining memory area authentication command to the HSM (S516).

The host CPU executes a task of initializing the elements constituting the system (S518a), and the HSM performs authentication of the rest of the memory except the boot code (S518b). Herein, step S518a and step S518b are performed simultaneously. Therefore, the host CPU can execute the application without receiving the application authentication result from the HSM.

Figure 7:
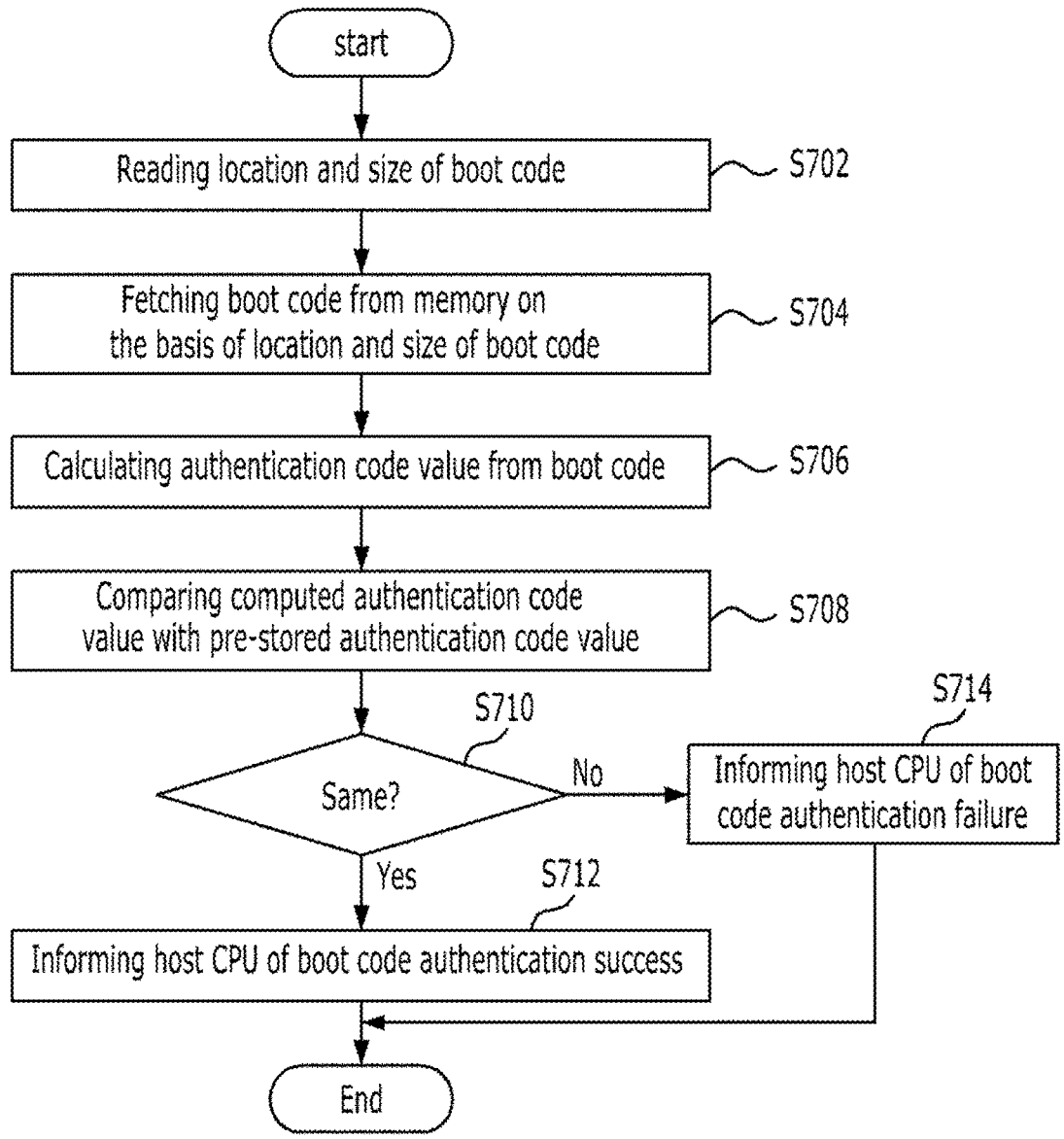
FIG. 7 is a diagram showing a method of authenticating a boot code by an HSM according to the present invention.

FIG. 7 is a diagram showing the method of authenticating the boot code by the HSM according to the present invention.

Referring to FIG. 7, the HSM reads the location and size of the pre-stored boot code (S702), and fetches the boot code from the memory on the basis of the read location and size of the read boot code (S704).

Then, the HSM computes the authentication code value from the boot code (S706) and compares the calculated authentication code value with the pre-stored authentication code value (S708) so as to determine whether the calculated authentication code value and the pre-stored authentication code value match each other (S710).

That is, the HSM computes a hash value by applying a hash function or hash algorithm to the boot code, and obtains the authentication code value by decrypting the encrypted digital signature value by using a public key or secret key. After that, the HSM compares the obtained authentication code value with the pre-stored authentication code value and determines whether the both authentication code values match each other.

If the both authentication code values match, the HSM informs the host CPU of the boot code authentication success (S712). Otherwise, the HSM informs the host CPU of the boot code authentication failure (S714).

Meanwhile, the method for secure boot of an engine management system can be composed as a program, and the codes and code segments constituting the program can be easily deduced by programmers in the field. In addition, a program with respect to the method for secure boot of an engine management system can be stored in an information storage medium (readable medium), which is readable by an electronic device, so as to be read and executed by the electronic device.

Thus, those skilled in the technical field, to which the present invention belongs, will recognize that the present invention can be practiced in other specific embodiments without departing from the spirit or essential characteristics thereof. It is therefore to be understood that the above-described embodiments are illustrative only and not restrictive of the scope of the present invention. In addition, the flowcharts shown in the drawings are only sequential steps, which are illustratively shown in order to achieve the most desirable result in practicing the present invention, and it goes without saying that other additional steps may be provided or some steps may be deleted.

Configurations implementing the technical features of the present invention, which are included in the block diagrams and flowcharts shown in the drawings attached hereto, refer to the logical boundaries between the configurations. However, according to a software or hardware embodiment, the depicted configurations and their functions may be implemented in the form of a standalone software module, a monolithic software structure, a code, a service, and combinations thereof and may be stored in a medium executable on a computer having a processor capable of executing stored program codes, command words, and the like such that the functions thereof may be implemented. Therefore, all such embodiments are also to be regarded as being within the scope of the present invention.

Accordingly, the accompanying drawings and the description thereof illustrate the technical features of the present invention, but should not be merely construed unless a specific arrangement of software for implementing such technical features is explicitly mentioned. That is, it should be understood that since various embodiments described above may exist and such embodiments may be partially modified while retaining the same technical features as the present invention, they are also considered to be within the scope of the present invention.

In addition, in the case of flowcharts, even though operations are depicted in the drawings in a particular order, which is shown for the sake of obtaining the most preferred result, it should not be understood that such operations should necessarily be performed in the specific order shown or in sequential order, or that all illustrated operations must necessarily be performed. In certain cases, multitasking and parallel processing may be advantageous. Besides, the separation of the various system components of the embodiments described above should not be understood as requiring such separation in all embodiments, and it should be understood that the program components and systems described can generally be integrated together into a single software product or packaged into multiple software products.

As such, the specification is not intended to limit the present invention to the specific terms disclosed. While the present invention has been particularly shown and described with reference to the above-mentioned exemplary embodiments thereof, those skilled in this technical field, to which the present invention belongs, will appreciate that various changes, modifications, and variations are possible without departing from the scope of the present invention. The scope of the present invention is defined by the appended claims rather than the foregoing description, and all changes or modifications derived from the meaning and scope of the claims and their equivalents should be construed as being included within the scope of the present invention.

What is claimed is:

1. A system for secure boot of an engine management system, comprising: a memory in which a boot code and at least one application are stored; a host CPU for sending a start-up command to a hardware security module HSM when a start-on or reset event occurs, and transmitting a remaining memory area authentication command to the HSM after executing the boot code when boot code authentication success is received from the HSM; and the HSM for starting up and performing authentication of the boot code stored in the memory as the start-up command is received, sending a boot code authentication result to the host CPU, and performing authentication of the rest of the memory excluding the boot code when the remaining memory area authentication command is received, wherein when the boot code is executed, the host CPU executes the application of the remaining memory area regardless of the authentication result thereof while the HSM performs the authentication of the remaining memory area.

2. The system for secure boot of an engine management system according to claim 1, wherein the memory is divided into application areas according to intended use, and a priority order can be set for integrity authentication by application area.

3. The system for secure boot of an engine management system according to claim 1, wherein the HSM fetches the boot code from the memory on the basis of the location and size of the pre-stored boot code, computes an authentication code value from the boot code, and authenticates the integrity of the boot code on the basis of whether the computed authentication code value matches a pre-stored authentication code value, and transmits the authentication result of the boot code to the host CPU.

4. The system for secure boot of an engine management system according to claim 1, wherein the HSM computes an authentication code value for the rest of the memory according to a priority order, and compares each computed authentication code value with a corresponding pre-stored authentication code value to check integrity.

5. The system for secure boot of an engine management system according to claim 1, wherein the HSM checks the integrity of the boot code in the foreground and the integrity of the rest of the memory in the background, before the host CPU executes the boot code.

6. A method for secure boot of an engine management system provided with a host CPU and a hardware security module HSM, comprising: (a) the step, by the host CPU, of transmitting a start-up command to the HSM when a start-on or reset event occurs; (b) the step, by the HSM, of starting up and authenticating a boot code stored in a memory and transmitting a boot code authentication result to the host CPU; (c) the step, by the host CPU, of executing the boot code and transmitting a remaining memory area authentication command to the HSM; and (d) the step, by the HSM, of performing authentication of rest of the memory except the boot code, wherein when the boot code is executed, the host CPU executes the application of the remaining memory area regardless of the authentication result thereof while the HSM performs the authentication of the remaining memory area.

7. The method for secure boot of an engine management system according to claim 6, wherein the step (b) comprises: the step of fetching the boot code from the memory on the basis of the location and size of the pre-stored boot code; the step of calculating an authentication code value from the boot code; the step of authenticating the integrity of the boot code on the basis of whether the computed authentication code value matches a pre-stored authentication code value; and the step of transmitting an authentication result of the boot code to the host CPU.

8. The method for secure boot of an engine management system according to claim 6, wherein in step (c), after transmitting the remaining memory area authentication command, the host CPU executes the application of the rest of the memory except the boot code.

9. The method for secure boot of an engine management system according to claim 6, wherein in step (d), the HSM computes each authentication code value for the rest of the memory according to a priority order and compares each computed authentication code value with a pre-stored corresponding authentication code value to check integrity.

* * * * *